United States Patent [19]

Kagawa

[11] Patent Number: 5,388,091
[45] Date of Patent: Feb. 7, 1995

[54] COMMUNICATIONS SYSTEM FOR COMMUNICATIONS BETWEEN AN ELECTRONIC CONTROL APPARATUS AND A TEST APPARATUS

[75] Inventor: Kenichi Kagawa, Itami, Japan

[73] Assignee: Sumitomo Electric Industries, Ltd., Osaka, Japan

[21] Appl. No.: 45,222

[22] Filed: Apr. 13, 1993

[30] Foreign Application Priority Data

Apr. 17, 1992 [JP] Japan .................................. 4-097692

[51] Int. Cl.6 .......................... H04L 5/14; H04J 3/14
[52] U.S. Cl. ...................................... 370/13; 370/31; 340/825.06; 307/10.1
[58] Field of Search ...................... 370/13, 14, 17, 24, 370/29, 31, 32, 16; 340/825.06, 825.5, 825.51, 827; 307/9.1, 10.1, 38, 39, 40

[56] References Cited

U.S. PATENT DOCUMENTS

| | | | |
|---|---|---|---|
| 4,599,719 | 7/1986 | Breen et al. | 370/31 |
| 4,653,044 | 3/1987 | Kudo | 370/31 |
| 4,897,831 | 1/1990 | Negi et al. | 370/31 |
| 5,121,382 | 6/1992 | Yang et al. | 370/31 |

FOREIGN PATENT DOCUMENTS

| | | | |
|---|---|---|---|
| 0239093 | 9/1987 | European Pat. Off. | 370/31 |
| 2741000 | 3/1979 | Germany. | |
| 598723 | 5/1978 | Switzerland. | |

OTHER PUBLICATIONS

*Data and Computer Communications*, by William Stallings (Macmillan Publishing Company 1988).
*M68HC11 Reference Manual*, published by Motorola, Inc. (1991), pp. 9-1 to 9-5.

Primary Examiner—Douglas W. Olms
Assistant Examiner—Alpus H. Hsu
Attorney, Agent, or Firm—Sandler Greenblum & Bernstein

[57] ABSTRACT

A communications system includes an electronic control apparatus having an asynchronous serial communications function and a test apparatus for checking the operation of the electronic control apparatus. The test apparatuses using different communications modes can be connected to a single electronic control apparatus. The test apparatus includes an identification signal generator for generating an identification signal identifying the full or half duplex communications mode of the specific test apparatus. The electronic control apparatus has both full and half duplex communications arrangements. Either the full or half duplex communications arrangement is selected according to the identification signal received from the test apparatus.

18 Claims, 3 Drawing Sheets

COMMUNICATIONS SYSTEM FOR COMMUNICATIONS BETWEEN AN ELECTRONIC CONTROL APPARATUS AND A TEST APPARATUS

BACKGROUND OF THE INVENTION

1. Field of the Invention

The present invention relates to a system enabling data communications between an electronic control apparatus and a test apparatus for testing the electronic control apparatus. More specifically, the invention relates to a communications system connected to enable data sending and receiving between an electronic control apparatus comprising a serial asynchronous communications function or mode for transmitting data and a test apparatus for checking the operation of said electronic control apparatus wherein the communications mode of the test apparatus differs from that of the electronic control apparatus.

One application for the invention is to enable data communications between a test apparatus and an automotive electronic control apparatus used for antilock brake control, engine control, or other automotive applications.

2. Description of the Prior Art

One type of common electronic control apparatus today is the electronic control unit used in automobiles to control the antilock brake control system.

In such an application, the electronic control apparatus calculates the vehicle speed, acceleration/deceleration of each wheel, and other parameters based on the input signals output from wheel speed sensors and other devices. When wheel skidding is detected from the minimum detected wheel speed and from the relationship between vehicle speed and wheel speed, the electronic control apparatus outputs control signals to the solenoids and motors used to drive the reflux pump and other components to alleviate skidding. These electronic control apparatuses also typically store a troubleshooting code that identifies trouble spots when a problem develops in the wheel speed sensors or other components.

These electronic control systems are typically self-regulating with a test apparatus provided to check whether the control signals are output to the motor and solenoids, and to read the troubleshooting codes to confirm the identified problem area. In such systems, the electronic control apparatus and test apparatus are linked via a communications bus, and data is sent and received between the components using serial communications protocols.

Two serial communications formats are commonly used: full duplex in which two signal buses are used discretely for sending and receiving, and half duplex in which one signal bus is used for both sending and receiving. As a result, if the electronic control apparatus and the test apparatus do not use the same communications format, it is not possible for data to be sent between the two devices.

This is a particular problem in mobile electronic control apparatuses because the communications formats of the electronic control apparatus are often different in different models and vehicle makes. This makes it necessary to have test apparatuses compatible with the different communications formats of the electronic control units, resulting in increased cost and inconvenience.

SUMMARY OF THE INVENTION

Therefore, an object of the present invention is to resolve this incompatibility in communications formats between electronic control and test apparatuses by enabling data sending and receiving between an electronic control apparatus and test apparatuses with a communications format different from that of the connected electronic control apparatus.

To achieve this object, the communications system according to the present invention connects an electronic control apparatus comprising a serial asynchronous communications function or mode for transmitting data and a test apparatus for checking the operation of said electronic control apparatus, and enables data sending and receiving there between. Said communications system comprises in the test apparatus an identification terminal for outputting different signals depending upon whether the communications format of the test apparatus is full duplex or half duplex, and comprises in the electronic control apparatus a communications circuit for determining the communications format of the test apparatus based on the output signal of the connected identification terminal, and setting the communications mode to enable communications with the test apparatus.

Specifically, the test apparatus comprises a communications terminal for connecting with the electronic control apparatus, and an identification terminal for outputting a voltage signal identifying whether the communications mode of the test apparatus is full or half duplex. The electronic control apparatus comprises both full and half duplex sending and receiving means, and a detection terminal for connection with the identification terminal of the test apparatus. The sending and receiving means are connected by the communications circuit to the external communications terminal through gates, and the gates are opened or closed according to the voltage input to the detection terminal. The connection terminal of the test apparatus is connected to the external communications terminal of the electronic control circuit, and the identification terminal of the test apparatus is connected to the detection terminal of the electronic control circuit. Based on the voltage signal input from the identification terminal to the detection terminal, either the gate between the external communications terminal and the full duplex sending/receiving means is opened, or the gate between the external communications terminal and the half duplex sending/receiving means is opened.

Because the communications system for communications between an electronic control apparatus and test apparatus according to the present invention is thus comprised, the electronic control apparatus can determine whether the communications mode of the test apparatus is full or half duplex based on the signal output by the identification terminal of the test apparatus, and the communications circuit is set accordingly to either full or half duplex.

More specifically, a gate means is provided in the communications circuit connecting the external communications terminal to the full duplex sending/receiving means and the half duplex sending/receiving means, and the voltage from the identification terminal is input to the gate means to connect the sending/receiving means matching the communications format of the test apparatus to the external communications terminal.

BRIEF DESCRIPTION OF THE DRAWINGS

The present invention will become more fully understood from the detailed description given below and the accompanying diagrams wherein.

DESCRIPTION OF PREFERRED EMBODIMENTS

The present invention is described below based on the preferred embodiment shown in the figures.

Figure 1:
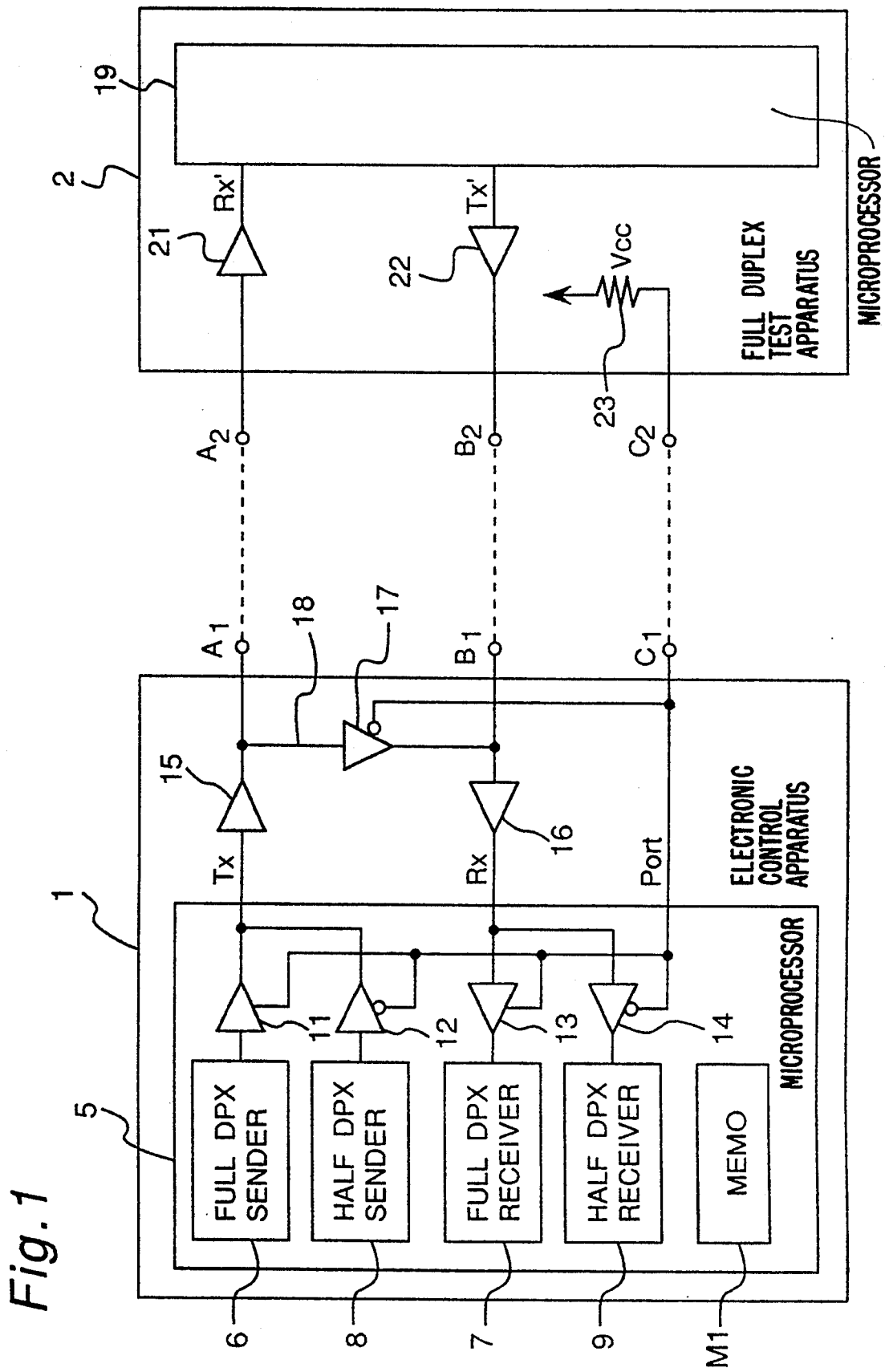
FIG. 1 is a block diagram of an electronic control apparatus connected to a full duplex test apparatus according to the present invention.
Figure 2:
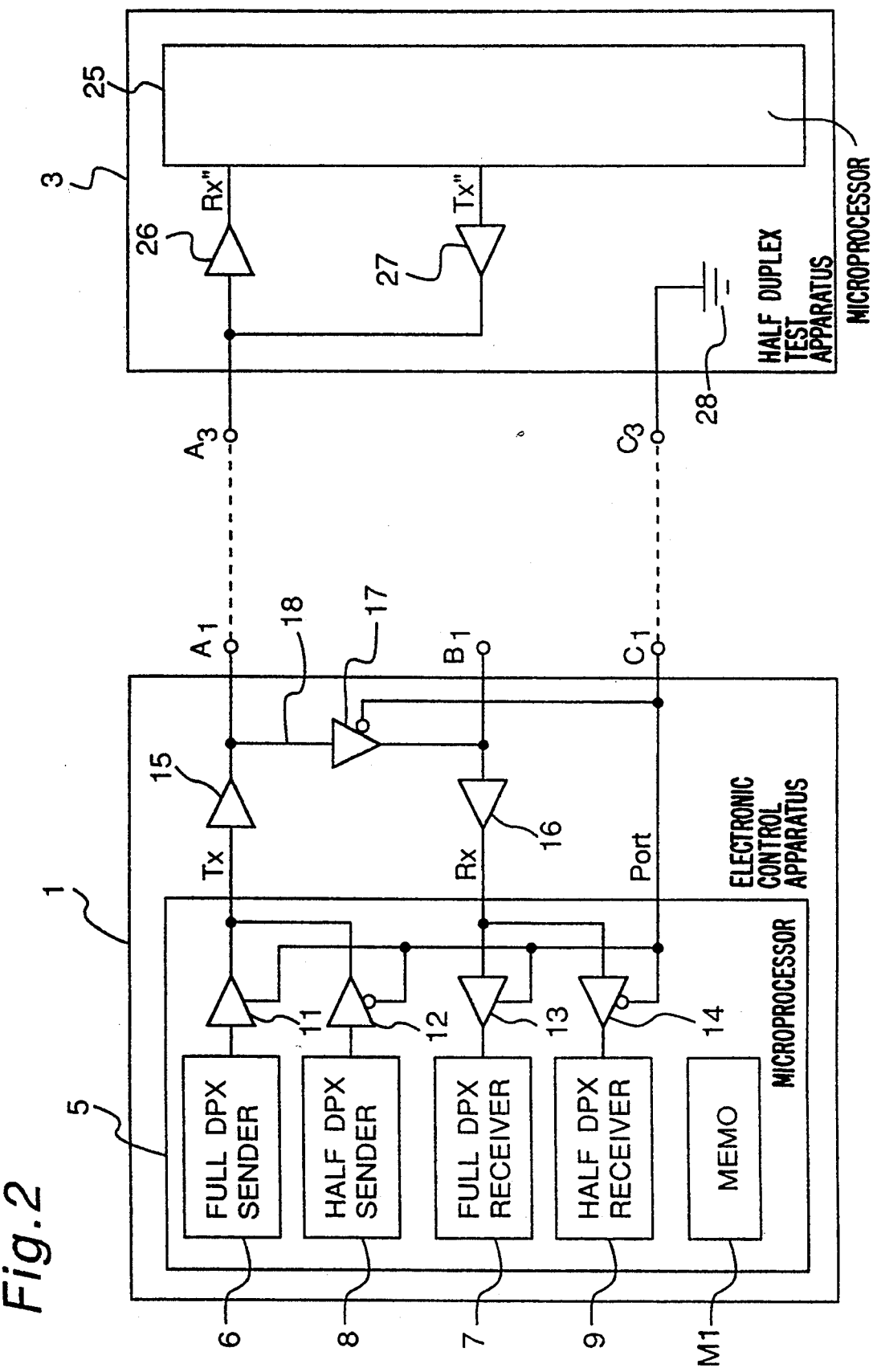
FIG. 2 is a block diagram of an electronic control apparatus connected to a half duplex test apparatus according to the present invention.

As shown in FIGS. 1 and 2, either a full duplex test apparatus 2 or a half duplex test apparatus 3 can be connected to the electronic control apparatus 1, and data is serially transmitted between the electronic control apparatus 1 and the connected test apparatus 2 or 3.

The electronic control apparatus 1 of this embodiment is an electronic control apparatus used in a motor vehicle, and comprises a microprocessor 5 with an asynchronous serial communications function or mode for transmitting data. The microprocessor 5 further comprises a memory M1 for storing a troubleshooting code identifying the trouble spot when a problem develops in any of the components of the antilock brake control system, including the motor and solenoids (not shown in the figures). The microprocessor 5 processes the signals input from the wheel speed sensors and other components based on an antilock control algorithm, and outputs control signals to the motor, solenoids, and other system components accordingly.

The microprocessor 5 in the electronic control apparatus 1 further comprises both full duplex sender 6 and receiver 7, and half duplex sender 8 and receiver 9. The full and half duplex senders 6 and 8 are connected to the serial transmission terminal Tx of the microprocessor 5 through respective first and second gates 11 and 12.

The microprocessor 5 port terminal Port voltage is input to both the first and second gates 11 and 12. When the Port voltage is HIGH, the first gate 11 opens, enabling the signal to flow from the full duplex sender 6 to the serial transmission terminal Tx. When the port terminal Port is connected to the ground, i.e., when the port terminal Port voltage is LOW, the second gate 12 opens, enabling the signal to flow from the half duplex sender 8 to the serial transmission terminal Tx.

The full and half duplex receiver 7 and 9 are similarly connected to the serial receiving terminal Rx of the microprocessor 5 through respective third and fourth gates 13 and 14.

The microprocessor 5 port terminal Port voltage is also input to both the third and fourth gates 13 and 14. When the Port voltage is HIGH, the third gate 13 opens, enabling the signal to flow to the full duplex receiver 7 from the serial receiving terminal Rx. When the port terminal Port voltage is LOW, the fourth gate 14 opens, enabling the signal to flow to the half duplex receiver 9 from the serial receiving terminal Rx.

Figure 3:
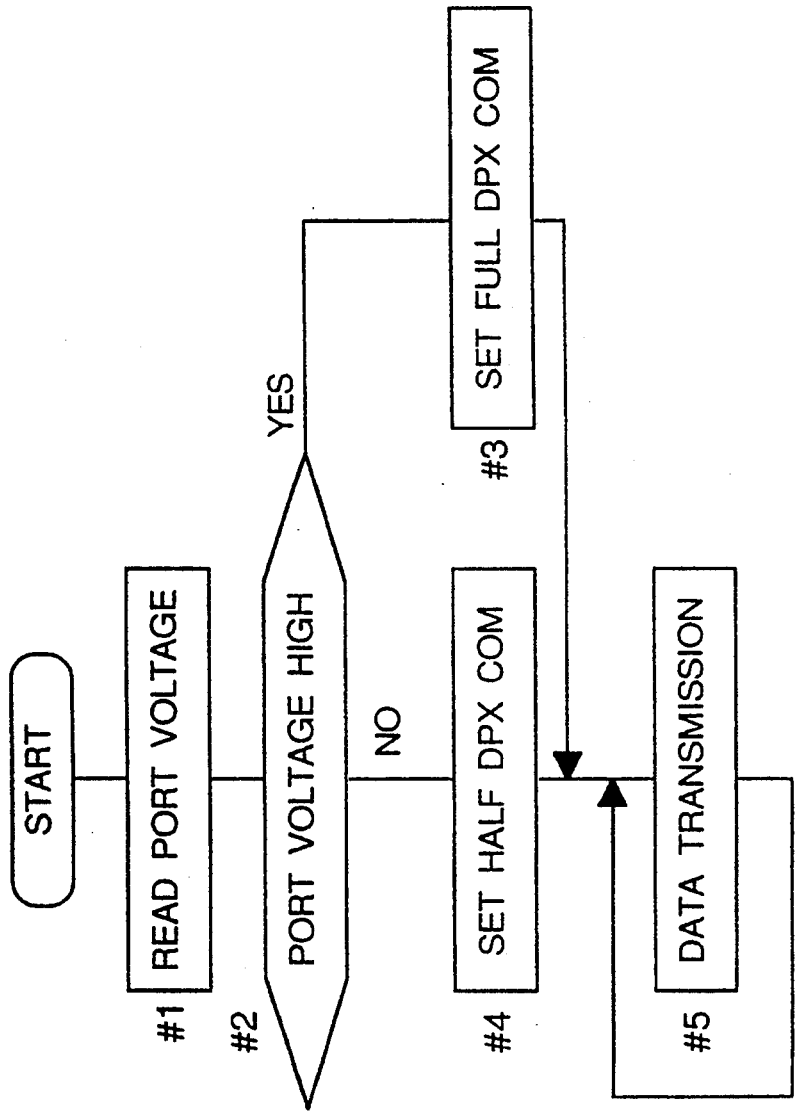
FIG. 3 is a flow chart of the communications control sequence of the invention.

The electronic control apparatus 1 microprocessor 5 is programmed as shown in FIG. 3 to select the appropriate communications control program according to the voltage signal input to the port terminal Port.

Referring to FIG. 3, the input voltage to the port terminal Port is read at step #1, and the HIGH/LOW state of this voltage is evaluated at step #2. If the port terminal Port voltage is HIGH (+Vcc), the microprocessor 5 selects the full duplex communications control program (step #3), but if the Port voltage is LOW (ground), the microprocessor 5 selects the half duplex communications control program (step #4). After the communications control program is thus adaptively selected, the microprocessor 5 proceeds to the normal data sending/receiving sequence between the test apparatuses 2, 3 (step #5).

Note that while the serial transmission terminal Tx, serial receiving terminal Rx, and port terminal Port are provided in the microprocessor 5 of the electronic control apparatus 1, these terminals are connected by a communications circuit of fifth, sixth, and seventh gates 15, 16, 17 to the first and second external communications terminals A1, B1 and detection terminal C1 used to connect the electronic control apparatus 1 to the test apparatus 2 or 3.

The serial transmission terminal Tx is connected through the fifth gate 15 to the first external communications terminal A1, thus controlling the signal flow from the serial transmission terminal Tx to the first external communications terminal A1.

The serial receiving terminal Rx is similarly connected through the sixth gate 16 to the second external communications terminal B1, thus controlling the signal flow from the second external communications terminal B1 to the serial receiving terminal Rx.

The port terminal Port is connected directly to the detection terminal C1.

A bypass line 18 with the seventh gate 17 connects the bus between the first external communications terminal A1 and fifth gate 15 to the bus between the second external communications terminal B1 and the sixth gate 16. The detection terminal C1 voltage is input to the seventh gate 17, which opens when the input voltage is LOW to permit the signal to flow from the first external communications terminal A1 to the serial receiving terminal Rx.

The full duplex test apparatus 2 shown in FIG. 1 comprises a microprocessor 19 for processing the troubleshooting code read from the electronic control apparatus 1, and outputs operational check signals to the electronic control apparatus 1.

The microprocessor 19 further comprises a serial receiving terminal Rx' and a serial transmission terminal Tx', and these terminals are respectively connected to the first and second communications terminals A2, B2 used to connect the full duplex test apparatus 2 to the electronic control apparatus 1.

A gate 21 is provided between the serial receiving terminal Rx' and the first external communications terminal A2 to pass signals one way only into the serial receiving terminal Rx'. Another gate 22 is similarly connected between the serial transmission terminal Tx' and the second external communications terminal B2 to pass signals one way only from the serial transmission terminal Tx' to the second external communications terminal B2.

This full duplex test apparatus 2 further comprises an identification terminal C2 for connection with the detection terminal C1 of the electronic control apparatus 1. The identification terminal C2 is connected to a voltage supply 23 in the test apparatus 2, and continuously outputs a HIGH voltage signal.

The half duplex test apparatus 3 shown in FIG. 2 similarly comprises a microprocessor 25 with a serial receiving terminal Rx" and a serial transmission terminal Tx".

The half duplex test apparatus 3 also comprises an external communications terminal A3 and an identification terminal C3 for connection with the first external communications terminal A1 and detection terminal C1, respectively, of the electronic control apparatus 1.

The external communications terminal A3 is connected to both the serial receiving Rx" and serial transmission Tx" terminals through gates 26 and 27, respectively. These gates 26 and 27 respectively regulate the signal flow either from the external communications terminal A3 into the serial receiving terminal Rx", or from the serial transmission terminal Tx" to the external communications terminal A3 only.

The identification terminal C3 is connected to the ground 28, and the voltage signal from the identification terminal C3 is always LOW.

The operating features of this embodiment of the invention are described below.

The first case to consider is the connection of the electronic control apparatus 1 to a full duplex test apparatus 2 as shown in FIG. 1. In this case, the first external communications terminal A1, second external communications terminal B1, and detection terminal C1 of the electronic control apparatus 1 are connected to the first external communications terminal A2, second external communications terminal B2, and identification terminal C2 of the full duplex test apparatus 2, respectively.

Because the identification terminal C2 always outputs a HIGH voltage signal as described above, a positive voltage is input to the first through fourth gates 11, 12, 13, 14, and the seventh gate 17 of the electronic control apparatus 1.

This HIGH voltage causes the first and third gates 11, 13 to open and pass the signal, and the second, fourth, and seventh gates 12, 14, 17 to close and impede the signal flow. As a result, signals can flow from the full duplex sender 6 through the serial transmission terminal Tx to the first external communications terminal A1, and from the second external communications terminal B1 through the serial receiving terminal Rx to the full duplex receiver 7 when the electronic control apparatus 1 is connected to a full duplex test apparatus 2.

As a result, when a full duplex test apparatus 2 is connected to the electronic control apparatus 1, the communications circuit of the electronic control apparatus 1 is automatically set to the full duplex communications mode.

As previously described, however, it is also possible to connect the electronic control apparatus 1 to a half duplex test apparatus 3.

In this case, the external communications terminal A3 and identification terminal C3 of the half duplex test apparatus 3 connect with the first external communications terminal A1 and detection terminal C1, respectively, of the electronic control apparatus 1. Because the half duplex test apparatus 3 identification terminal C3 is connected to the ground 28, a LOW voltage is output to the first through fourth gates 11, 12, 13, 14, and the seventh gate 17 of the electronic control apparatus 1. This LOW voltage causes the first and third gates 11, 13 to close and impede the signal flow, and the second, fourth, and seventh gates 12, 14, 17 to open and pass the signal flow. The signal from the half duplex sender 8 therefore flows through the serial transmission terminal Tx to the first external communications terminal A1, and signals input from the first external communications terminal A1 flow through the seventh gate 17 and serial receiving terminal Rx into the half duplex receiver 9.

When the port terminal Port detects a LOW voltage signal at the identification terminal C3 of the connected half duplex test apparatus 3, the microprocessor 5 sets the communications control program to the half duplex mode to enable data sending and receiving between the electronic control apparatus 1 and the half duplex test apparatus 3 in the same way communications is controlled with the full duplex test apparatus 2 connection described above.

As a result, when a half duplex test apparatus 3 is connected to the electronic control apparatus 1, the communications circuit of the electronic control apparatus 1 is automatically set to the half duplex communications mode.

It is to be noted that the present invention shall not be limited to the embodiment described above, and variations are possible as will be obvious to those skilled in the art. For example, the electronic control apparatus of the present embodiment is described as a mobile electronic control apparatus for antilock brake system control, but it can also be used for engine control and is not necessarily limited to automotive applications. In addition, the gates in the internal microprocessor of the electronic control apparatus are directly controlled by the signal from the identification terminal of the test apparatus, but the gates may alternatively be controlled in software by the communications control program, for example.

In addition, a HIGH voltage signal at the identification terminal is used to identify a full duplex test apparatus, and a ground voltage signal at the identification terminal is used to identify a half duplex test apparatus, but the voltage signals of the test apparatus identification terminal can in practice be any signals enabling positive recognition of the full or half duplex communications mode.

As will be known from the above description, the system enabling communications between an electronic control apparatus and test apparatus according to the invention comprises in the test apparatus an identification terminal outputting different signals according to the full or half duplex communications mode used by the test apparatus, and sets the communications circuit of the electronic control apparatus to enable communications with the test apparatus by determining the communications mode of the test apparatus from the signal output from the identification terminal. The electronic control apparatus is therefore able to send and receive data with both full and half duplex test apparatuses. It is thus possible by means of the present invention to connect plural test apparatuses using different communications modes to a single electronic control apparatus, thereby enabling universal use of the test apparatus and reducing costs.

Using the present invention, it is also not necessary to change the communications circuit or other components of the electronic control apparatus when the communications mode of the test apparatus is changed.

In addition, the present invention offers the advantage of achieving the effect described above by means of a simple construction, requiring only an identification terminal outputting a voltage signal corresponding to the communications mode of the test apparatus, and gates that are opened and closed based on this voltage signal in the communications circuit of the electronic control apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication system, comprising:

a test apparatus having a fixed communication mode for sending and receiving data, said test apparatus comprising identification terminal means for outputting an identification signal indicating the fixed communication mode of said test apparatus as either one of a full duplex communication mode and a half duplex communication mode; and an electronic control apparatus comprising detection terminal means for receiving said identification signal from said test apparatus, communication circuit means for selectively sending and receiving data, including troubleshooting data indicating an operational status of said electronic control apparatus, in either said full duplex communication mode or said half duplex communication mode, and enabling means responsive to said identification signal for enabling said communication circuit means to send data to and receive data from said test apparatus in accordance with the fixed communication mode of said test apparatus;

said test apparatus further comprising microprocessor means for evaluating the operational status of said electronic control apparatus based on the troubleshooting data from said electronic control apparatus.

2. A communication system according to claim 1, wherein said electronic control apparatus is an automotive electronic control unit, and comprises memory means for storing said troubleshooting data.

3. A communication system according to claim 2, wherein said troubleshooting data indicates the operational status of a plurality of components of an antilock brake control system.

4. A communication system according to claim 1, wherein said electronic control apparatus has a serial asynchronous communication mode, said communication circuit means comprising a full duplex communication circuit for sending and receiving data in said full duplex communication mode, a half duplex communication circuit for sending and receiving data in said half duplex communication mode, and a serial transmission terminal and a serial receiving terminal which are selectively connected to said full and half duplex communication circuits and to said test apparatus.

5. A communication system according to claim 4, wherein said enabling means comprises gate means for connecting said serial transmission terminal and said serial receiving terminal to either one of said full duplex communication circuit and said half duplex communication circuit based on said identification signal from said test apparatus.

6. A communication system according to claim 5, wherein said enabling means further comprises a bypass line that is selectively opened and closed to disconnect and connect said serial transmission terminal with said serial receiving terminal based on said identification signal, such that said terminals are connected to one another when said identification signal indicates said half-duplex communication mode and said terminals are disconnected from one another when said identification signal indicates said full duplex communication mode.

7. A communication system for sending and receiving data between an automotive electronic control apparatus and a test apparatus having a fixed communication mode;

said test apparatus comprising means for generating an identification signal indicating the fixed communication mode of said test apparatus; and said automotive electronic control apparatus comprising terminal means for receiving said identification signal, communication circuit means for selectively sending and receiving data in one of a plurality of communications modes, including the fixed communication mode of said test apparatus, and means for enabling said communication circuit means to send data to and receive data from said test apparatus based on said identification signal and in accordance with the fixed communication mode of said test apparatus;

said automotive electronic control apparatus further comprising memory means for storing troubleshooting data indicating an operational status of said electronic control apparatus, said test apparatus further comprising microprocessor means for evaluating the operational status of said electronic control apparatus based on the troubleshooting data.

8. A communication system according to claim 7, wherein said troubleshooting data indicates the operational status of a plurality of components of an antilock brake control system.

9. A communication system according to claim 7, wherein said fixed communication mode of said test apparatus is either one of a full duplex communication mode and a half duplex communication mode.

10. A communication system according to claim 9, wherein said automotive electronic control apparatus has a serial asynchronous communication mode, said communication circuit means comprising a full duplex communication circuit for sending and receiving data in said full duplex communication mode, a half duplex communication circuit for sending and receiving data in said half duplex communication mode, and a serial transmission terminal and a serial receiving terminal which are selectively connected to said full and half duplex communication circuits and to said test apparatus.

11. A communication system according to claim 10, wherein said enabling means comprises gate means for connecting said serial transmission terminal and said serial receiving terminal to either one of said full duplex communication circuit and said half duplex communication circuit based on said identification signal from said test apparatus.

12. A communication system according to claim 11, wherein said enabling means further comprises a bypass line that is selectively opened and closed to disconnect and connect said serial transmission terminal with said serial receiving terminal based on said identification signal, such that said terminals are connected to one another when said identification signal indicates said half duplex communication mode and said terminals are disconnected from one another when said identification signal indicates said full duplex communication mode.

13. A communication system for sending and receiving data between an electronic control apparatus and a test apparatus;

said test apparatus having a fixed communication mode for sending and receiving data, said test apparatus comprising identification terminal means for outputting an identification signal indicating the fixed communication mode as either one of a full duplex communication mode and a half duplex communication mode, and means for evaluating an operational status of said electronic control apparatus;

said electronic control apparatus comprising detection terminal means for receiving said identification signal, communication circuit means for selectively sending and receiving data in either said full duplex communication mode or said half duplex communication mode, and means for enabling said communication circuit means to send data to and receive data from said test apparatus based on said identification signal and in accordance with the fixed communication mode of said test apparatus.

14. A communication system according to claim 13, wherein said electronic control apparatus comprises an automotive electronic control unit having a memory for storing troubleshooting data supplied to said test apparatus indicating an operational status of said automotive electronic control unit.

15. A communication system according to claim 14, wherein said troubleshooting data indicates the operational status of a plurality of components of an antilock brake control system.

16. A communication system according to claim 13, wherein said electronic control apparatus has a serial asynchronous communication mode, said communication circuit means comprising a full duplex communication circuit, a half duplex communication circuit, and a serial transmission terminal and a serial receiving terminal which are selectively connected to said full and half duplex communication circuits and to said test apparatus.

17. A communication system according to claim 16, wherein said enabling means comprises gate means for connecting said serial transmission terminal and said serial receiving terminal to either one of said full duplex communication circuit and said half duplex communication circuit based on said identification signal from said test apparatus.

18. A communication system according to claim 17, wherein said enabling means further comprises a bypass line that is selectively opened and closed to disconnect and connect said serial transmission terminal with said serial receiving terminal based on said identification signal, such that said terminals are connected to one another when said identification signal indicates said half duplex communication mode and said terminals are disconnected from one another when said identification signal indicates said full duplex communication mode.

* * * * *